(12) United States Patent
Liu et al.

(10) Patent No.: US 11,429,795 B2
(45) Date of Patent: Aug. 30, 2022

(54) MACHINE TRANSLATION INTEGRATED WITH USER ANALYSIS

(71) Applicant: INTERNATIONAL BUSINESS MACHINES CORPORATION, Armonk, NY (US)

(72) Inventors: Su Liu, Austin, TX (US); Yu Liu, Beijing (CN); Cheng Xu, Beijing (CN); Shunguo Yan, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 282 days.

(21) Appl. No.: 16/740,920

(22) Filed: Jan. 13, 2020

(65) Prior Publication Data

US 2021/0216727 A1 Jul. 15, 2021

(51) Int. Cl.
*G06F 40/58* (2020.01)
*G06F 40/47* (2020.01)
*G06F 40/51* (2020.01)

(52) U.S. Cl.
CPC .............. *G06F 40/58* (2020.01); *G06F 40/47* (2020.01); *G06F 40/51* (2020.01)

(58) Field of Classification Search
CPC ........... G06F 40/58; G06F 40/47; G06F 40/51
See application file for complete search history.

(56) References Cited

U.S. PATENT DOCUMENTS

| 6,760,695 | B1* | 7/2004 | Kuno | G06F 40/268 |
| | | | | 704/9 |
| 6,937,974 | B1* | 8/2005 | d'Agostini | G06F 40/44 |
| | | | | 704/277 |
| 7,934,012 | B2* | 4/2011 | Martinez | G06F 9/44505 |
| | | | | 709/219 |
| 8,275,615 | B2* | 9/2012 | Kozat | G10L 15/32 |
| | | | | 704/277 |
| 8,972,268 | B2* | 3/2015 | Waibel et al. | G10L 21/00 |
| 9,471,563 | B2 | 10/2016 | Trese | |
| 10,025,776 | B1* | 7/2018 | Sjoberg | G06Q 10/0631 |

(Continued)

FOREIGN PATENT DOCUMENTS

| JP | 2003022265 A | * | 1/2003 | ......... G06F 17/2836 |
| WO | WO-2017112813 A1 | * | 6/2017 | ....... G06F 16/90332 |

OTHER PUBLICATIONS

IBM, "z/Architecture—Principles of Operation," IBM Publication No. SA22-7832-11, Twelfth Edition, Sep. 2017, pp. 1-1902.

(Continued)

*Primary Examiner* — Lamont M Spooner
(74) *Attorney, Agent, or Firm* — Edward J. Wixted, III, Esq.; Blanche E. Schiller, Esq.; Heslin Rothenberg Farley & Mesiti P.C.

(57) ABSTRACT

A combined translation request is obtained that includes content of a first language to be translated to a second language combined with translation context information of a user for which translation is to be performed. The content is translated, using machine translation, from the first language to the second language based on the translation context information to provide a translation. The translation is adjusted based on one or more identified translation factors selected based on user feedback to provide an adjusted translation. The adjusted translation is provided to the user.

20 Claims, 7 Drawing Sheets

(56) References Cited

U.S. PATENT DOCUMENTS

| | | |
|---|---|---|
| 10,114,819 B2 | 10/2018 | Zhang et al. |
| 11,328,463 B2 * | 5/2022 | No .................... G06Q 30/0255 |
| 2002/0103632 A1 * | 8/2002 | Dutta .................... G06F 40/58 704/2 |
| 2003/0236658 A1 * | 12/2003 | Yam ...................... G06F 40/55 704/2 |
| 2013/0124987 A1 * | 5/2013 | Lakritz ............... H04L 63/0281 715/264 |
| 2014/0303957 A1 * | 10/2014 | Lee ........................ G06F 40/58 704/2 |
| 2017/0124071 A1 | 5/2017 | Huang et al. |
| 2017/0132217 A1 * | 5/2017 | Na ............................ G06N 3/08 |
| 2017/0270104 A1 | 9/2017 | Alshikh et al. |
| 2018/0095949 A1 * | 4/2018 | Lewis et al. ............ G06F 17/28 |
| 2018/0314689 A1 * | 11/2018 | Wang .................. G10L 15/1822 |
| 2019/0019511 A1 * | 1/2019 | Kawano .................. G10L 15/10 |
| 2020/0073945 A1 * | 3/2020 | Huang .................... G06F 9/453 |
| 2020/0279024 A1 * | 9/2020 | Misawa ............... G06N 3/0454 |
| 2020/0394271 A1 * | 12/2020 | Bihani .................... G06F 40/45 |
| 2021/0026923 A1 * | 1/2021 | Dalce .................... G10L 15/005 |
| 2021/0216727 A1 * | 7/2021 | Liu ........................ G06F 40/47 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

MACHINE TRANSLATION INTEGRATED WITH USER ANALYSIS

BACKGROUND

One or more aspects relate, in general, to processing within a computing environment, and in particular, to performing machine translation within such an environment.

Machine translation is the translation of text or speech from one language to another language using software. There are a number of translation services that provide such translations, including the IBM Watson® translation service. IBM Watson is a trademark or registered trademark of International Business Machines Corporation in at least one jurisdiction.

Machine translation services use pre-defined translation rules and configurations to translate text and speech from one language to another language.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes obtaining a combined translation request that includes content of a first language to be translated to a second language combined with translation context information of a user for which translation is to be performed. The content is translated, using machine translation, from the first language to the second language based on the translation context information to provide a translation. The translation is adjusted based on one or more identified translation factors to provide an adjusted translation. The one or more identified translation factors are selected based on user feedback, and the adjusted translation is provided to the user.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification in conjunction with the accompanying drawings in which:

DETAILED DESCRIPTION

In accordance with one or more aspects, customized machine translation is provided that is based on selected characteristics, such as selected characteristics based on user preferences. Further, in one aspect, the customized machine translation is optimized based on user analysis and input. In one aspect, machine learning is used in optimizing the machine translation.

One embodiment of a computing environment to incorporate and use one or more aspects of the present invention is described with reference to FIG. 1. As examples, the computing environment is based on the z/Architecture® hardware architecture, the PowerPC® hardware architecture, the Power Architecture® hardware architecture, or other architectures, offered by International Business Machines Corporation, Armonk, N.Y., and/or other companies. z/Architecture, PowerPC and Power Architecture are trademarks or registered trademarks of International Business Machines Corporation in at least one jurisdiction.

Figure 1:
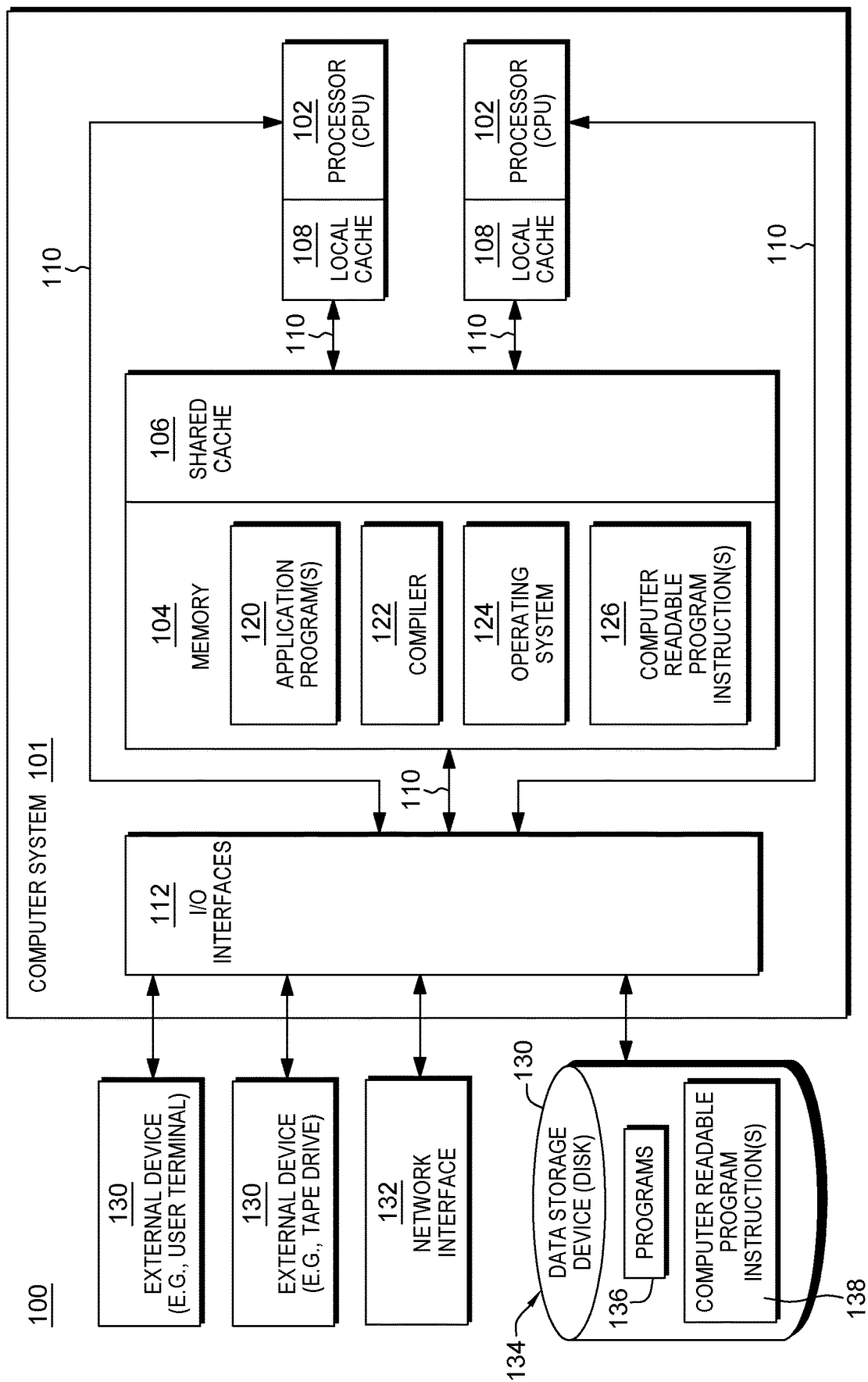
FIG. 1 depicts one example of a computing environment to incorporate and/or use one or more aspects of the present invention.

As shown in FIG. 1, a computing environment 100 includes, for instance, a computer system 101 shown, e.g., in the form of a general-purpose computing device. Computer system 101 may include, but is not limited to, one or more processors or processing units 102 (e.g., central processing units (CPUs)), a memory 104 (a.k.a., system memory, main memory, main storage, central storage or storage, as examples), and one or more input/output (I/O) interfaces 112, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 104 may include, for instance, a cache 106, such as a shared cache, which may be coupled to local caches 108 of processors 102. Further, memory 104 may include one or more programs or applications 120, a compiler 122, an operating system 124, and/or one or more computer readable program instructions 126. Computer readable program instructions 126 may be configured to carry out functions of embodiments of aspects of the invention.

Computer system 101 may also communicate via, e.g., I/O interfaces 112 with one or more external devices 130, including one or more data storage devices 134, and/or one or more network interfaces 132. Other example external devices include a user terminal, a tape drive, a pointing device, a display, etc. Network interface 132 enables computer system 101 to communicate with one or more networks, such as a local area network (LAN), a general wide area network (WAN), and/or a public network (e.g., the Internet), providing communication with other computing devices or systems.

Data storage device 134 may store one or more programs 136, one or more computer readable program instructions 138, and/or data, etc. The computer readable program instructions may be configured to carry out functions of embodiments of aspects of the invention.

Computer system 101 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 101. Examples include, but are not limited to: microcode, device drivers, redundant processing units, external disk drive arrays, RAID systems, tape drives, and data archival storage systems, etc.

Computer system 101 may be operational with numerous other general-purpose or special-purpose computing system environments or configurations. Examples of well-known computing systems, environments, and/or configurations that may be suitable for use with computer system 101 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

One or more of the processors of FIG. 1 (e.g., processors 102) are used, in accordance with an aspect of the present invention, to provide a translation service that performs machine translations that are customized and/or optimized. Further details regarding such a translation service are described with reference to FIG. 2.

Figure 2:
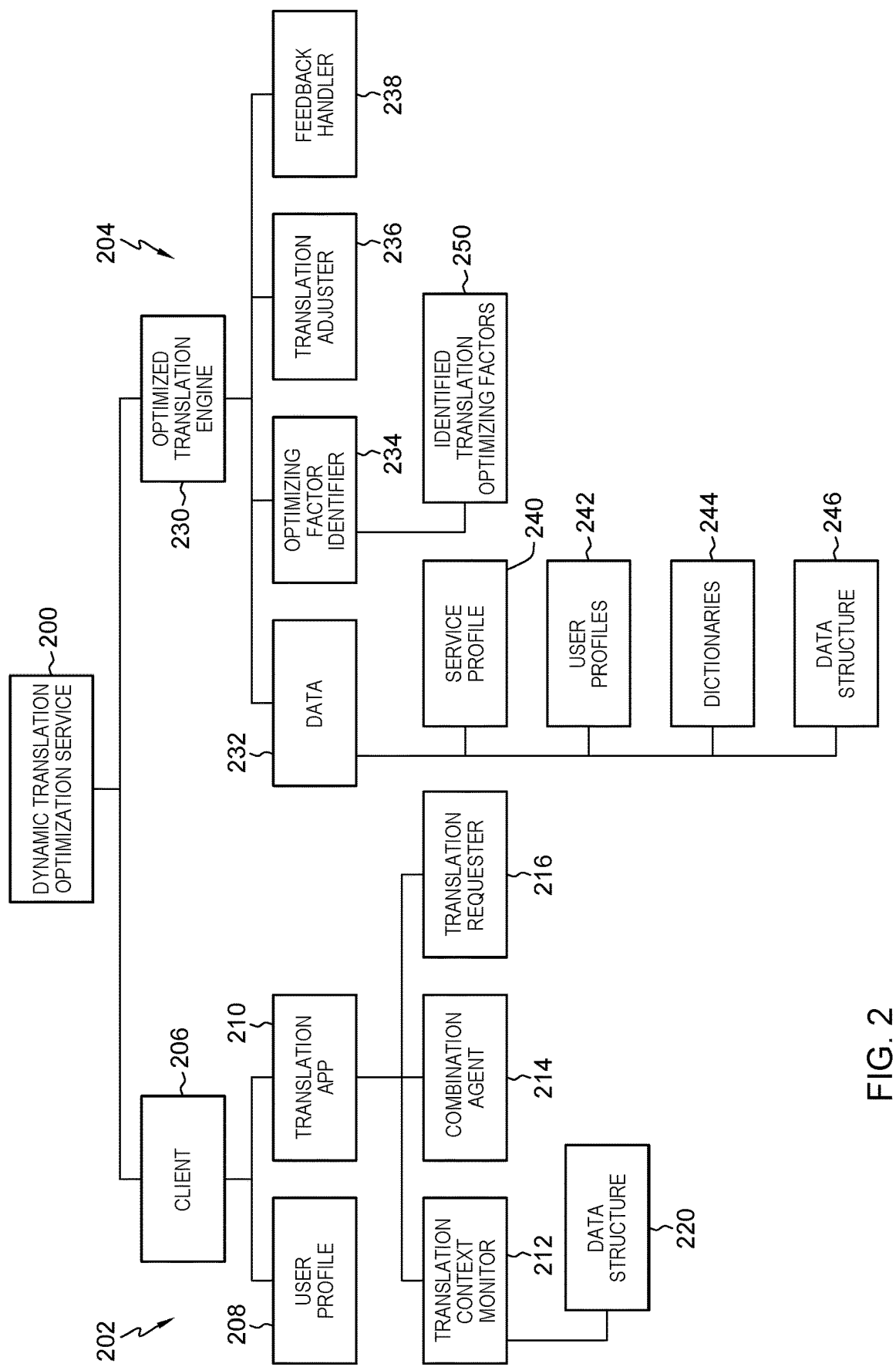
FIG. 2 depicts one example of modules of a translation service used in accordance with one or more aspects of the present invention.

Referring to FIG. 2, in one embodiment, a dynamic translation optimization service 200 includes a client-side 202 and a server-side 204, each of which includes a plurality of components/modules used to provide customized and/or optimized machine translations, in accordance with one or more aspects of the present invention. Each of the components/modules resides and/or executes on one or more processors (e.g., processors 102) of one or more computing systems and is further described below.

In one example, client-side 202 includes at least one client processor 206 (e.g., a processor 102) having access to a user profile 208 and executing a translation application 210. User profile 208 includes, for instance, a configurable file that includes personal and/or preferential characteristics of one or more users, including, for instance, literacy level in one or more languages, location, social group, age, skills, translation mechanism (a.k.a., type of translation), hobbies, interested topics and/or the user's feedback from previous usage of a machine translation, etc. As a particular example, a profile for a user, User 1, may include: User Name: User 1, Age=15, 1st Lang=Chinese (Level=10), 2nd Lang=English (Level=6), social group=student, skills=piano, hobby=game, interested=history, translation mechanism=literal translation, etc. Other, fewer and/or additional characteristics may be included.

Translation application 210 is, for instance, a client-side language translation application for translating content (e.g., words, phrases, sentences, text, speech, articles, etc.) from a first language (e.g., Chinese or another language) to a second language (e.g., English or another language). Example translation applications include an IBM Watson® translation application. Translation application 210 is coupled to and/or has access to a plurality of modules, including, but not limited to, a translation context monitor 212, a real-time bidirectional context-aware channel combination agent 214 (referred to herein as a combination agent), and a translation requester 216, each of which is further described below.

Translation context monitor 212 is a module used to determine translation context information in real-time. For instance, the monitor may use online services to determine and/or update information regarding the user, such as age, hobbies, social group, interests, etc. It may also, in one example, have a camera and/or video equipment to capture a user's expression, e.g., regarding a translation (approve/disapprove), etc. Translation context monitor 212 saves the obtained and/or determined information in a data structure 220 (e.g., a real-time bi-directional context-aware channel data structure) coupled thereto. In one example, the data structure has the following format: Data Structure Data (APPID, UserID, SocialGroupID, 1st LanguageID, 1st Language_Level, 2nd LanguageID, 2nd Language_Level, SkillIDList, HobbyList, InterestedList, previousSatisfactionScore, translation_mechanism, location, other context information), in which for instance, APPID is an identification of a translation application to be used, UserID is an identification of the user, SocialGroupID is an indication of the user's social group (e.g., student, professional, etc.), 1st LanguageID is an indication of the user's primary language, 1st Language_Level is an indication of the user's proficiency level of the 1st language (e.g., in a range from 1 to 10, 10 being the highest), 2nd LanguageID is an indication of the user's secondary language, 2nd Language_Level is an indication of the user's proficiency level of the 2nd language, SkillIDList is a list of skills of the user, HobbyList is a list of hobbies of the user, InterestedList is a list of interests of the user, previousSatisfactionScore is an indication on a sliding scale (e.g., 1 to 10) of how satisfied the user was with a previous translation, and translation_mechanism is an indication of a selected translation mechanism. The data structure may include other, fewer and/or additional characteristics and/or be in a different format.

In one example, initially, data structure 220 is populated with data from the user profile (e.g., user profile 208) and then updated via translation context monitor 212. For example, the user profile may include information provided by the user, default information set by the system and/or determined based on similar users, and/or have missing information. This information is then updated, in one example, based on the translation context information. For example, if the user's proficiency level in a particular language is missing from the profile, the monitor can determine it by examining online readings and writings by the user whose email is in the profile. Other examples are also possible. The updates may be stored in the user profile and/or the data structure.

Combination agent 214 is a module used to combine a user's data structure data with the translation request (e.g., content to be translated). For instance, when a user, e.g., User 1, inputs content (e.g., "山中无老虎，猴子称霸王") in a Chinese-English idiom translation application, User 1's Data Structure_Data is combined with the translation request "山中无老虎，猴子称霸王".

Translation requester 216 is a module used to submit the combined request to an optimized translation engine 230 on server-side 204.

Optimized translation engine 230 is a module that runs on a processor (e.g., a processor 102 on the same system or a different system than client 206) and receives a translation request/data structure data, such as a combined translation request that includes, for instance, the translation request (e.g., content to be translated) and the Data Structure Data (e.g., context for translating the content). In one example, optimized translation engine 230 is coupled to or has access to data 232, an optimizing factor identifier 234, a translation adjuster 236, and a feedback handler 238, each of which is described in further detail below.

Data 232 includes, but is not limited to, one or more of: a service profile 240, one or more user profiles 242 (e.g., user profile 208 described above), one or more dictionaries 244 (e.g., English, Chinese, other language, particular level (e.g., elementary, collegiate, etc.)), and a data structure 246 (e.g., data structure 220). Service profile 240 identifies the level of service requested by the user. For instance, there may be a number of levels of service (e.g., translation service) offered to the user, each with a specified fee ($0 or other) and the service profile indicates, e.g., the level of service paid for and/or selected by the user.

Optimizing factor identifier 234 is a module used to identify the user and correlated identified translation optimizing factors 250, which are recorded in the data structure data. For example, the factors may be recorded as, e.g., an identification of the translation application to be used (e.g., APPId=Chinese-English Idiom Translation App), the language environment of the content (e.g., 1st LanguageID=Chinese), the user's literacy level in multiple languages (e.g., 1st Language_Level for Chinese=10 and 2nd Language_Level for English=6), social group (e.g., SocialGroup ID=student), age (e.g., AGE=15), skills (e.g., SkillIDList=piano), hobby (e.g., HobbyList=game), interested topics (e.g., InterestedList=history), and the user's feedback from previous usage (e.g., previousSatisfactionScore=3), other context information, etc. A set of context awareness analysis features may also be included for identifying users and to replace content (e.g., word/phrase/sentence) according to the users' personal preferential characteristics, service profile, the requested contexts, and feedback, as an example.

In one example, each identified translation optimization factor has a weight associated therewith, which may be adjusted based on user feedback, as described herein. Further, based on the factors used and the weights associated therewith, a weight is assigned to the identified optimization. This weight may be a sum of the weights, an average of the weights, etc.

Translation adjuster 236 is a module used to adjust the translated output based on a set of translation optimizing factors (e.g., identified translation optimizing factors 250) and the user feedback.

Feedback handler 238 is a module used to collect the user's feedback, adjust translation service quality and resend other translation results, as needed or desired. In one example, if the user is satisfied with the result of translation, weights of one or more identified optimization factors 250 are adjusted, e.g., increased. If the user is not satisfied according to one or more factors, including but not limited to, emotional and/or facial expression detection (which is provided in one example via the translation context monitor), weights of one or more identified optimization factors are adjusted (e.g., decreased), accordingly. Other examples are possible. For instance, if satisfied, in another embodiment, the weights may remain the same. Other examples are also possible.

As examples, user satisfaction of the result (whether satisfied or dissatisfied) may be determined based on emotional and/or facial expression, user input, a score, etc.

One example of adjusting one or more optimizing factors based on user feedback includes: User 1 is in English class and wishes to obtain an equivalent English translation of a selected Chinese phrase. In one example, a Chinese-English Idiom Dictionary is used, and the user's profile indicates that the preferred translation is literal translation and the context is English class. This information is obtained, e.g., from the data structure (e.g., data structure 246) and based thereon, the machine translation returns the following translation:

"山中无老虎，猴子称霸王"→

"When there is no tiger on the mountain—the monkey becomes king"

If User 1 is not satisfied with the following returned translation (literal translation) from a translation service engine, as indicated by, e.g., user feedback, then, a second translation (free-translation) can be resent to User 1, automatically:

"山中无老虎，猴子称霸王"→

"When the cat is away, the mice will play."

The translation system can automatically (i.e., without manual user intervention) switch default translation rules from "literal" to "free" next time when User 1 sends a request in English class.

Although in the above example, the type of translation was changed (e.g., literal to free), in other examples, additional and/or other changes to the translation optimization factors may be made (e.g., automatically) to alter the translation based on the user's preferences.

Figure 3:
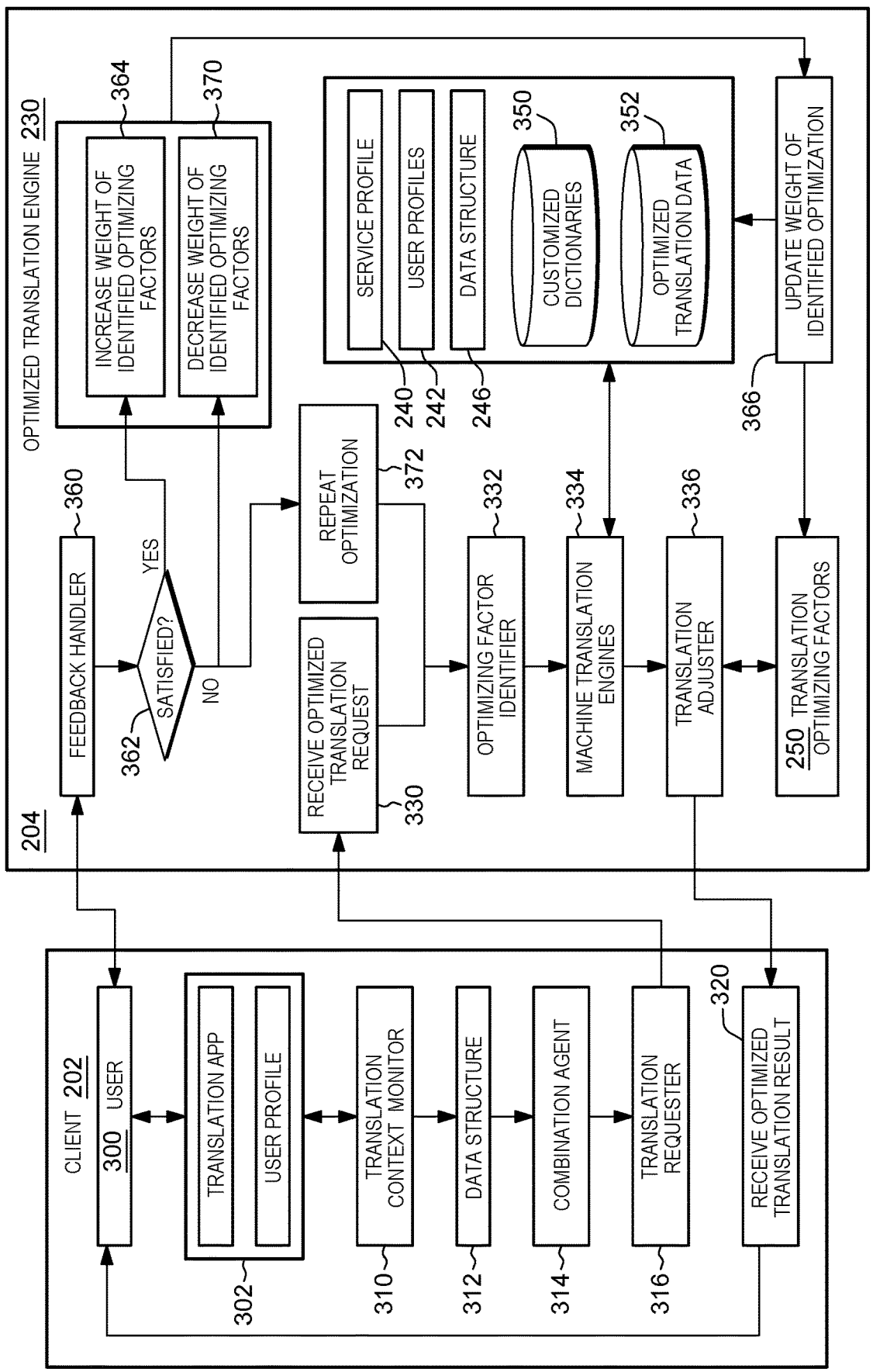
FIG. 3 depicts one example of providing a customized and/or optimized machine translation, in accordance with one or more aspects of the present invention.

Further details relating to one or more aspects of the present invention are described with reference to FIG. 3. On client-side 202, a user 300 provides or updates its user profile (e.g., user profile 208) and uses a translation application (e.g., translation application 210) to request translation of selected content (e.g., a word, phrase, sentence, text, speech, etc.), STEP 302. In accordance with an aspect of the present invention, a translation context monitor (e.g., translation context monitor 212) determines translation context information in real-time by, for instance, using online services, monitoring websites, capturing a user's expression, etc., to provide context for the requested translation, STEP 310. For instance, the translation context monitor monitors websites or performs other online searches to determine, e.g., that the user is, e.g., a student, literacy level of the user in one or more languages, appropriate level of dictionary to use (e.g., collegiate, elementary, etc.), etc. The translation context monitor determines context information that, e.g., provides, updates and/or adds to the user profile information.

The translation context information is stored in a data structure, such as data structure 220, STEP 312. Further, in accordance with an aspect of the present invention, the Data Structure Data, e.g., (APPID, UserID, SocialGroupID, 1st LanguageID, 1st Language_Level, 2nd LanguageID, 2nd Language_Level, SkillIDList, HobbyList, InterestedList, previousSatisfactionScore, translation_mechanism, location, other context information), is combined with the translation request using a combination module (e.g., combination agent 214), STEP 314. The combined request is submitted via a requester (e.g., translation requester 216) to optimized translation engine 230 on server-side 204, STEP 316.

The optimized translation request is received by optimized translation engine 230, STEP 330. Further, in one example, an identification of the user and correlated translation factors (e.g., information stored in data structure 220 for the user) are obtained using a module, such as optimizing factor identifier 234, STEP 332. The translation request (e.g., content to be translated) and correlated translation factors (e.g., identified translation optimizing factors 250 and/or other information stored in data structure 220) are input to one or more machine translation engines selected from a plurality of machine translation engines, STEP 334. The plurality of machine translation engines have, for instance, customized information for translating content, including, for instance, different translation dictionaries (e.g., customized dictionaries 350) for translating the user's requested input (e.g., content to be translated) based on context information to provide translated output (e.g., optimized translation data 352). The one or more machine translation engines selected are, e.g., those with the appropriate dictionary, based on the correlated translation factors.

The translated output is provided, in accordance with an aspect of the present invention, to a translation adjuster (e.g., translation adjuster 236), which is used to adjust the translation, if deemed necessary, to provide a satisfactory translation for the user. The adjustment is based on a set of translation optimizing factors (e.g., translation optimizing factors 250) including and/or based on, for instance, the user's feedback, as described below, STEP 336. It is possible that no adjustment is made (e.g., prior to receiving the user's feedback). Nevertheless, for convenience, the output from the translation adjuster is referred to herein as the adjusted translation. The adjusted translation is then forwarded to client-side 202. The optimized translation result is received, STEP 320, and forwarded to user 300 (and/or other users). Optionally, the user provides feedback to a feedback handler, e.g., feedback handler 238.

In one aspect, a feedback handler (e.g., feedback handler 238) collects user feedback regarding the translation, STEP 360. This may be performed a number of ways including, but not limited to, through user input; expression automatically obtained via a translation context monitor (e.g., translation context monitor 212) and/or other module; and/or other mechanisms. A determination is made, based on the feedback, as to whether the user is satisfied with the translation, INQUIRY 362. For instance, if a satisfaction score within a particular range (e.g., 6-10) is provided, the user is deemed satisfied with the translation; otherwise, the user is deemed unsatisfied. Other ways of determining satisfaction may be used and/or other ranges.

If the user is satisfied, then, in one example, one or more weights of one or more identified optimization factors (e.g., translation optimizing factors 250) are adjusted (e.g., increased), STEP 364, and an overall weight associated with the identified optimization is updated based on the adjusted weights of the identified translation optimizing factors, STEP 366. However, if the user is dissatisfied with the translation, INQUIRY 362, then in one example, one or more weights assigned to one or more optimization factors are adjusted (e.g., decreased), STEP 370, and processing continues with STEP 366. Based on the adjusted weights, a set of translation optimizing factors (e.g., translation optimizing factors 250) for the user is determined and provided to the translation adjuster (e.g., translation adjuster 236) to be used for further translation. For instance, if the initial translation for the classroom example described above used a literal translation resulting in an unsatisfactory translation, then the translation factors for another translation for the classroom example replaces literal translation with free translation, as an example.

Further, in one example, the optimization is repeated, STEP 372. For instance, the requested content is translated again based on the translation optimizing factors stored, e.g., in data structure 246, using one or more selected machine translation engines, STEPS 332-334. The translated data is then input to the translation adjuster, which, in this example, adjusts the translation based on the updated translation optimizing factors 250 (e.g., uses free translation instead of literal translation, etc.). The adjusted translation is then forwarded to the client-side. Processing continues with STEP 320.

In one example, if the user is satisfied with the repeated translation, the translation optimizing factors stored in the data structure (e.g., data structure 246) are updated. Optimization may be repeated one or more times.

As described herein, a customized machine translation with self-learning is provided. A user is able to select translation mechanisms (e.g., literal translation vs. free translation) to tailor the translation to the user. A customized machine translation service is provided based on personal characteristics, preferences, and/or user feedback. Different users may have different standards to subjectively judge a returned translation according to own personal characteristics, such as, for instance, literacy level in the 1st and 2nd languages, occupation, education, skills, hobby, slang, locale, social group, age, interested topics, etc. The returned translation is evaluated by the user and based on the evaluation, the translation may be repeated with additional, fewer and/or other factors to provide a more satisfactory translation to the particular user.

In one or more aspects, dynamic and automatic translation optimization integrated with user satisfaction analysis for customizing a machine translation service is provided. An automated translation optimization mechanism and service are provided based on a real-time interactive translation context-aware channel. An optimized translation engine is defined with user preference awareness analysis features for identifying users and their translation preferences and selected proper translation dictionaries according to the user's input. A data structure is defined to bi-directionally exchange translation contexts, such as personal characteristics (e.g., literacy level in the 1st and 2nd languages, dialect, location, social group, age, skills, hobby, interested topics) and user's feedback. A user's translation context information is determined in real-time and saved into a data structure. The data structure data is combined with each translation request, and the combined translation request is sent from a client-side to a server. The user and correlated translation optimizing factors (e.g., language environment, context, and the requester's personal characteristics) are determined based on the requester's contexts. The requested contents are translated with the best results for the user based on the identified translation optimizing factors. In such a way, translated content (e.g., word, phrases, sentences, speech, etc.) is optimized, in one aspect, according to the users' preferences and personal characteristics, requesting contexts, and feedback. Service feedback is further used for adjusting translation service quality and second translation results are resent. Optimization factors are refined and optimized translation data (in an automated way) is updated.

In one or more aspects, a user's feedback is automatically obtained based on translation requests and used to adapt factors used for future requests. This is performed automatically and in real-time, providing a real-time translation engine that dynamically learns and adapts based on context information, and historic user feedback. A user's context information of a translation request is determined in real-time since it is combined, saved and transferred with the request. One or more aspects proactively optimize translation output based on embedded user preference context information. A user's translation context information is determined and identified in a first translation request in real-time since the user's translation context information is combined with the request, saved and transferred through a bidirectional translation context-aware channel (e.g., data structure). Further, the user's feedback is either directly inputted by the user or automatically identified from translation requests, which is used to make correlated adaptions.

In one or more aspects, as an example, machine learning is used to optimize machine translations and/or to evaluate the translation with respect to what is being learned. Machine learning algorithms generate and train algorithms to create a model utilized to train and/or evaluate the artificial intelligence-based machine translation service. For instance, in an initialization stage, program code (e.g., hardware and/or software) trains these algorithms, based on, for instance, patterns and/or other data.

Figure 4:
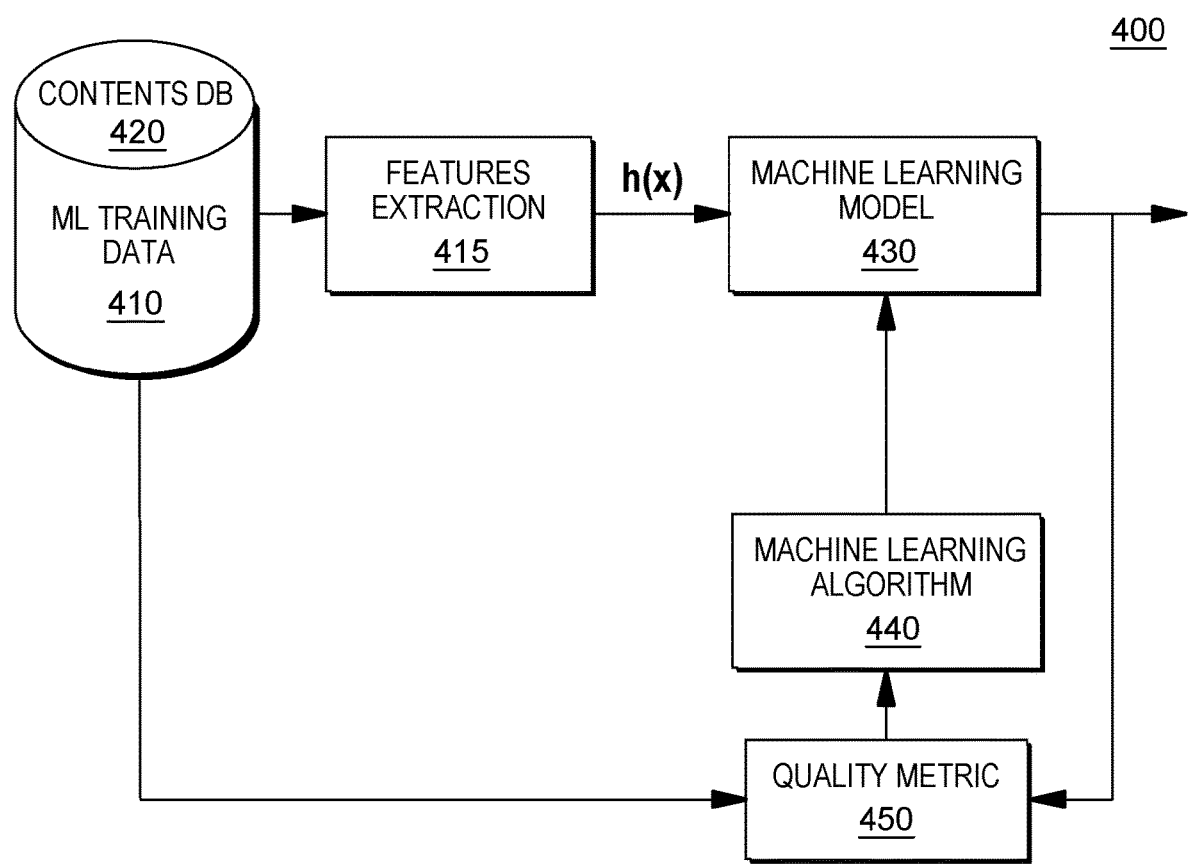
FIG. 4 depicts one example of using machine learning in one or more aspects of the present invention.

FIG. 4 is an example of a machine learning training system 400 utilized, in one or more aspects, to perform cognitive analyses of various inputs, including training data, test data, generated translations and/or other data. Training data utilized to train the model in one or more embodiments of the present invention includes, for instance, data that is specific to what is being learned. The program code in embodiments of the present invention performs a cognitive analysis to generate data structures, including algorithms utilized by the program code to perform translations. Machine learning (ML) solves problems that are not solved with numerical means alone. In this ML-based example, program code extracts various features/attributes/data from ML training data 410 (e.g., information collected from various data sources relevant to the training), which may be resident in one or more databases 420 comprising subject-related data and general data. Features extraction 415 is utilized to develop a predictor function, h(x), also referred to as a hypothesis, which the program code utilizes as a machine learning model 430.

In identifying various states and/or behaviors indicative of states in the ML training data 410, the program code can utilize various techniques including, but not limited to, mutual information, which is an example of a technique that can be utilized to identify features (e.g., elements, patterns, attributes, etc.). Further varying techniques may be used to select features, including but not limited to, diffusion mapping, principal component analysis, recursive feature elimination (a brute force approach to selecting features), and/or a Random Forest, to select the attributes related to various subject states (e.g., training/test data). The program code may utilize a machine learning algorithm 440 to train the machine learning model 430 (e.g., the algorithms utilized by the program code), including providing weights for the conclusions, so that the program code can train the predictor functions that comprise the machine learning model 430. The conclusions may be evaluated by a quality metric 450. By selecting a diverse set of ML training data 410, the program code trains the machine learning model 430 to identify and weight various attributes (e.g., features, patterns, data) that correlate to various states of a subject (e.g., user, etc.).

The model generated by the program code is self-learning as the program code updates the model based on active feedback received from subjects (e.g., users and/or other input). For example, when the program code determines that there is material to be learned that was not previously predicted by the model, the program code utilizes a learning agent to update the model to reflect that information, in order to improve predictions in the future. Additionally, when the program code determines that a prediction is incorrect, either based on receiving user feedback through an interface or based on continuously monitoring the subject, the program code updates the model to reflect the inaccuracy of the prediction for the given period of time. Program code comprising a learning agent cognitively analyzes the data deviating from the modeled expectations and adjusts the model in order to increase the accuracy of the model, moving forward.

In one or more embodiments, program code executing on one or more processors, utilizes an existing cognitive analysis tool or agent to tune the model, based on data obtained from the various data sources. One or more embodiments utilize, for instance, the IBM Watson® system as the cognitive agent; however, other cognitive agents may be used. In one or more embodiments, the program code interfaces with, e.g., IBM Watson application programming interfaces (APIs) to perform a cognitive analysis of obtained data.

In one or more embodiments, the program code trains aspects of one or more IBM Watson application program interfaces (APIs) to learn the material being taught. Utilizing an existing cognitive agent, such as the IBM Watson system, expands the type of subject data that the program code can integrate into the model. For example, data can include documentary, text, visual, and audio data, which the program code can process, based on its utilization of the IBM Watson system. Specifically, in one or more embodiments, certain of the APIs of the IBM Watson system comprise a cognitive agent (e.g., learning agent) that includes one or more programs, including, but not limited to, natural language classifiers, Retrieve and Rank (i.e., a service available through the IBM Watson® Developer Cloud™ that can surface the most relevant information from a collection of documents), concepts/visual insights, trade off analytics, document conversion, and/or relationship extraction. In an embodiment, one or more programs analyze the data obtained by the program code across various sources utilizing one or more of a natural language classifier, retrieve and rank APIs, and trade off analytics APIs. The IBM Watson application program interfaces (APIs) can also provide audio related API services, in the event that the collected data includes audio, which can be utilized by the program code, including but not limited to natural language processing, text to speech capabilities, and/or translation.

In one or more embodiments, the program code utilizes a neural network to analyze the collected, learned and/or generated data to generate the model utilized to train and/or evaluate the translation. Neural networks are a biologically-inspired programming paradigm which enable a computer to learn from observational data, learned data, generated data, and/or other data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (e.g., states) in data (i.e., neural networks are non-linear statistical data modeling or decision-making tools). In general, program code utilizing neural networks can model complex relationships between inputs and outputs and identify patterns in data and to generate conversation and/or evaluate such conversation. Because of the speed and efficiency of neural networks, especially when parsing multiple complex data sets, neural networks and deep learning provide solutions to many problems in multiple source processing, which the program code in one or more embodiments accomplishes when obtaining data and generating a model for evaluation and/or training of artificial intelligence-based processes, such as artificial intelligence-based translation.

One or more embodiments may utilize a neural network (NN) to predict future states of a given subject (e.g., predict future factors regarding translation). Utilizing the neural network, the program code can predict the likelihood of the given state at a subsequent time. The program code obtains (or derives) data related to the subject and/or content being learned from various sources to generate an array of values (possible states) to input into input neurons of the NN. Responsive to these inputs, the output neurons of the NN produce an array that includes the predicted states. The program code can automatically transmit notifications related to the predicted states based on the perceived validity.

In one or more embodiments, a neuromorphic processor or trained neuromorphic chip can be incorporated into the computing resources executing the program code. One example of a trained neuromorphic chip that is utilized in an embodiment of the present invention is the IBM® TrueNorth Chip™, produced by International Business Machines Corporation. IBM, TrueNorth, and Developer Cloud are trademarks or registered trademarks of International Business Machines Corporation in at least one jurisdiction.

The IBM TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million ($2^{28}$). Memory, computation, and communication are handled in each of the 4096 neurosynaptic cores, so TrueNorth circumvents the von-Neumann-architecture bottlenecks and is very energy-efficient.

One or more aspects of the present invention are inextricably tied to computing and improve the technical fields of artificial intelligence, including artificial intelligence-based translation, and/or machine learning, as examples. Technological improvements are provided in machine translations to improve communication, translation efficiency, translation accuracy and/or user experience with machine translations. Further, technological improvements are provided in computing by, for instance, improving speed and/or efficiency in machine translations.

Figure 5A:
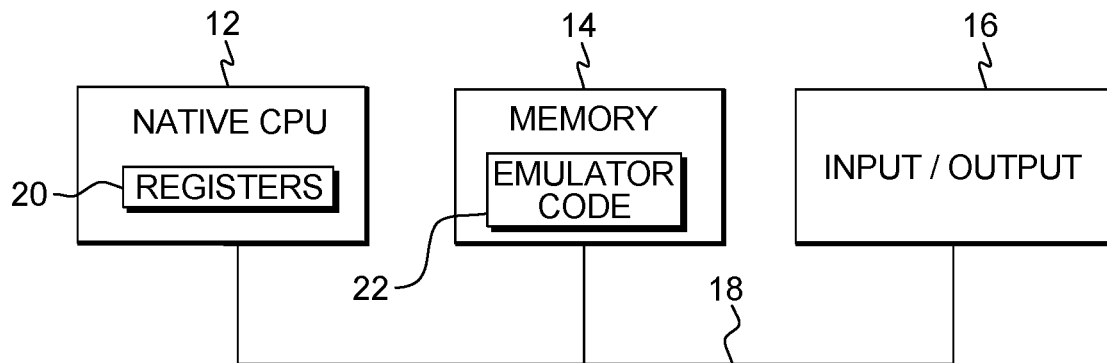
FIG. 5A depicts another example of a computing environment to incorporate and use one or more aspects of the present invention.

Other types of computing environments may also incorporate and use one or more aspects of the present invention, including, but not limited to, emulation environments, an example of which is described with reference to FIG. 5A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; and/or other machines based on architectures offered by International Business Machines Corporation, Intel Corporation, or other companies. PowerPC is a trademark or registered trademark of International Business Machines Corporation in at least one jurisdiction. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 5B:
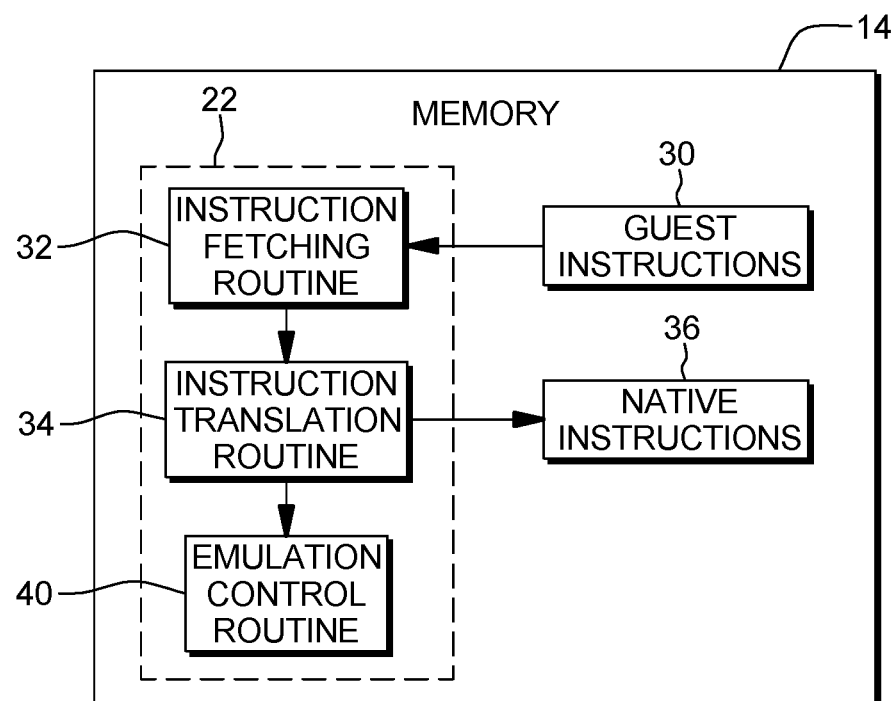
FIG. 5B depicts one example of further details of the memory of FIG. 5A.

Further details relating to emulator code 22 are described with reference to FIG. 5B. Guest instructions 30 stored in memory 14 comprise software instructions (e.g., correlating to machine instructions) that were developed to be executed in an architecture other than that of native CPU 12. For example, guest instructions 30 may have been designed to execute on a z/Architecture processor, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
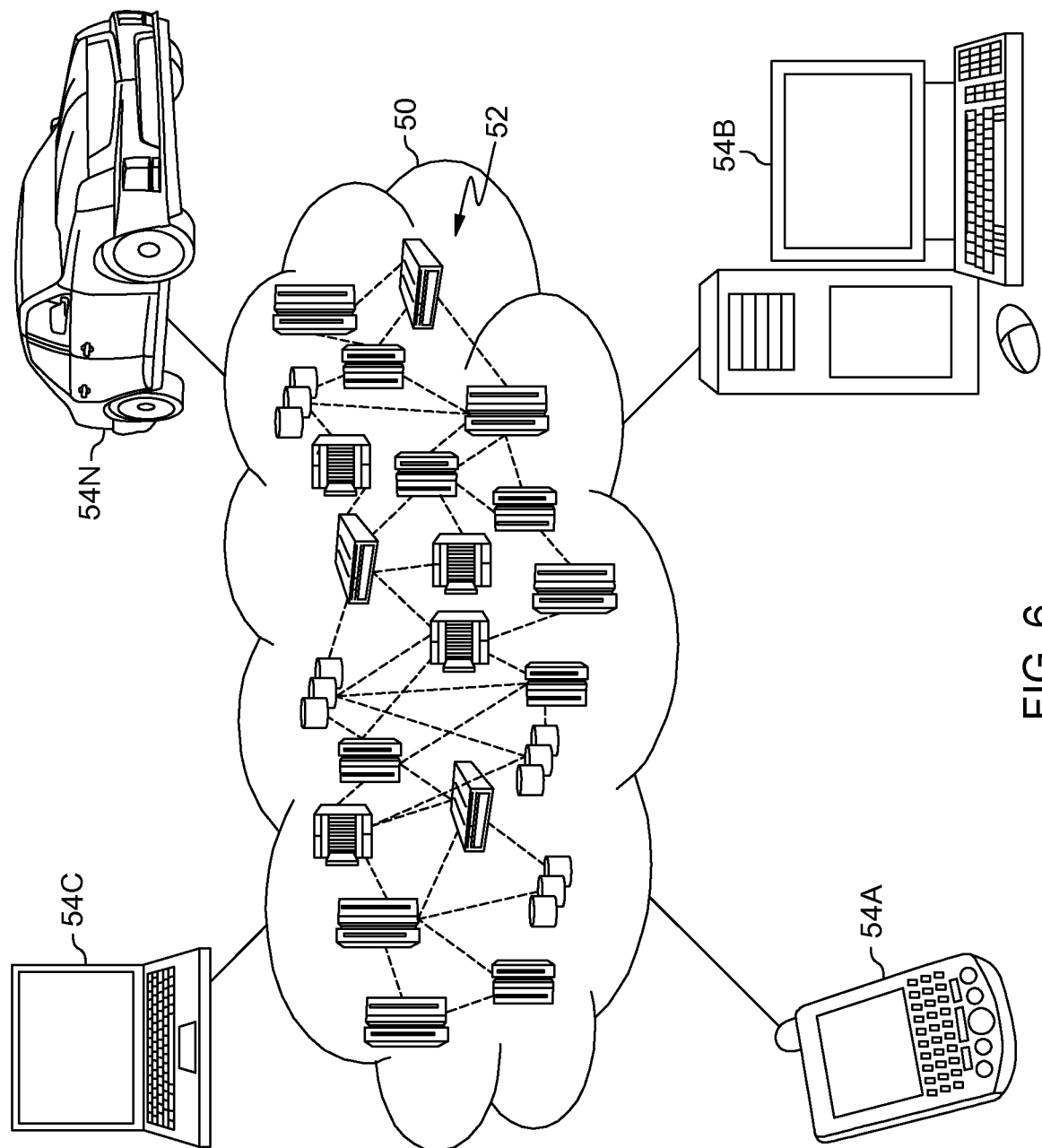
FIG. 6 depicts one embodiment of a cloud computing environment.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
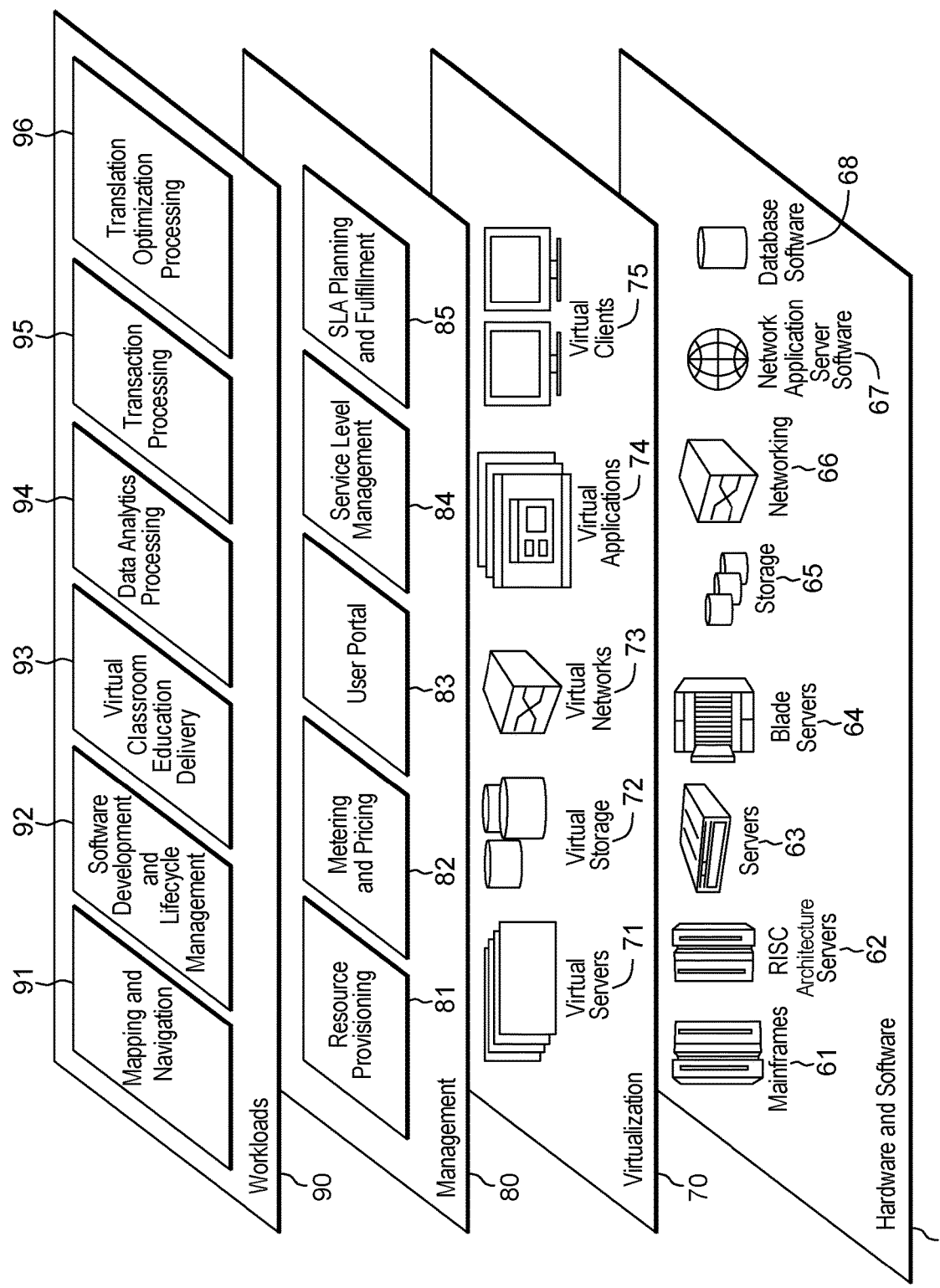
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and translation optimization processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different factors and/or modules may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

at least one computer readable storage medium readable by at least one processing circuit and storing instructions for performing a method comprising:

obtaining a combined translation request, the combined translation request comprising content of a first language to be translated to a second language combined with translation context information of a user for which translation is to be performed, the translation context information being particular to the user and the first language being different from the second language;

translating, using a machine translation engine running on a processor, the content from the first language to the second language based on the translation context information to provide a translation, the machine translation engine being selected from a plurality of machine translation engines based on the translation context information;

obtaining, by a translation adjuster executing on the processor, the translation, the translation adjuster to adjust the translation based on there being an adjustment to be performed;

providing an output of the translation adjuster to a client processor to be forwarded to the user;

obtaining, by the processor, user feedback on the output;

determining, by the processor, based on a satisfaction indication, whether the user is satisfied with the output;

automatically changing, by the processor, based on determining that the user is dissatisfied with the output as indicated by the satisfaction indication, one or more identified translation factors to provide updated translation information, wherein the automatically changing includes changing a type of translation indicated in the translation context information from one type of translation mechanism to another type of translation mechanism, the one type of translation mechanism being selected from a literal translation and another translation type and the another type of translation mechanism being selected from the literal translation and the another translation type and being different from the one type of translation mechanism;

repeating the translating the content from the first language to the second language to obtain another translation, wherein the repeating is performed automatically absent obtaining another combined translation request requesting translation of the content;

adjusting, by the translation adjuster, the other translation based on the updated translation information to provide an adjusted translation output; and providing the adjusted translation output to the client processor to be forwarded to the user.

2. The computer program product of claim 1, wherein the translation context information is determined using information obtained online and includes information relating to the user.

3. The computer program product of claim 2, wherein the information includes one or more of the following selected from a group consisting of: type of translation, literacy level in one or more languages, dialect, location, social group, age, skills, hobby, and interested topics.

4. The computer program product of claim 1, wherein the translation context information is stored in a data structure, the data structure used to bi-directionally exchange translation context between the client processor and a server processor, the server processor obtaining the combined translation request from the client processor.

5. The computer program product of claim 1, wherein the method further comprises:

obtaining feedback from the user on the adjusted translation output; and updating the adjusted translation information based on the feedback.

6. The computer program product of claim 1, wherein the method further comprises:

determining that the adjusted translation output is to be further adjusted for the user; and adjusting at least one identified translation factor of the one or more identified translation factors based on determining that the adjusted translation output is to be further adjusted for the user to provide at least one adjusted identified translation factor.

7. The computer program product of claim 6, wherein the method further comprises:

repeating the translating of the content to provide another content translation; and adjusting the another content translation based on, at least, the at least one adjusted identified translation factor.

8. The computer program product of claim 1, wherein the method further comprises making one or more adjustments to one or more translation factors of the translation context information, based on determining that the user is satisfied with the translation as indicated by the satisfaction indication.

9. The computer program product of claim 8, wherein the making the one or more adjustments includes adjusting at least one weight of at least one translation factor of the one or more translation factors to provide at least one adjusted translation factor.

10. The computer program product of claim 1, wherein the method further comprises:

automatically switching translation information of the user to the updated translation information to be used in another combined translation request.

11. A computer system for facilitating processing within a computing environment, the computer system comprising:

a memory; and a processor in communication with the memory, wherein the computer system is configured to perform a method, said method comprising:

obtaining a combined translation request, the combined translation request comprising content of a first language to be translated to a second language combined with translation context information of a user for which translation is to be performed, the translation context information being particular to the user and the first language being different from the second language;

translating, using a machine translation engine running on the processor, the content from the first language to the second language based on the translation context information to provide a translation, the machine translation engine being selected from a plurality of machine translation engines based on the translation context information;

obtaining, by a translation adjuster executing on the processor, the translation, the translation adjuster to adjust the translation based on there being an adjustment to be performed;

providing an output of the translation adjuster to a client processor to be forwarded to the user;

obtaining, by the processor, user feedback on the output;

determining, by the processor, based on a satisfaction indication, whether the user is satisfied with the output;

automatically changing, by the processor, based on determining that the user is dissatisfied with the output as indicated by the satisfaction indication, one or more identified translation factors to provide updated translation information, wherein the automatically changing includes changing a type of translation indicated in the translation context information from one type of translation mechanism to another type of translation mechanism, the one type of translation mechanism being selected from a literal translation and another translation type and the another type of translation mechanism being selected from the literal translation and the another translation type and being different from the one type of translation mechanism;

repeating the translating the content from the first language to the second language to obtain another translation, wherein the repeating is performed automatically absent obtaining another combined translation request requesting translation of the content;

adjusting, by the translation adjuster, the other translation based on the updated translation information to provide an adjusted translation output; and providing the adjusted translation output to the client processor to be forwarded to the user.

12. The computer system of claim 11, wherein the translation context information is determined using information obtained online and includes information relating to the user.

13. The computer system of claim 11, wherein the translation context information is stored in a data structure, the data structure used to bi-directionally exchange translation context between the client processor and a server processor, the server processor obtaining the combined translation request from the client processor.

14. The computer system of claim 11, wherein the method further comprises:

determining that the adjusted translation output is to be further adjusted for the user; and adjusting at least one identified translation factor of the one or more identified translation factors based on determining that the adjusted translation output is to be further adjusted for the user to provide at least one adjusted identified translation factor.

15. The computer system of claim 14, wherein the method further comprises:

repeating the translating of the content to provide another content translation; and adjusting the another content translation based on, at least, the at least one adjusted identified translation factor.

16. A computer-implemented method of facilitating processing within a computing environment, the computer-implemented method comprising:

obtaining, by at least one processor, a combined translation request, the combined translation request comprising content of a first language to be translated to a second language combined with translation context information of a user for which translation is to be performed, the translation context information being particular to the user and the first language being different from the second language;

translating, using a machine translation engine running on the at least one processor, the content from the first language to the second language based on the translation context information to provide a translation, the machine translation engine being selected from a plurality of machine translation engines based on the translation context information;

obtaining, by a translation adjuster executing on the at least one processor, the translation, the translation adjuster to adjust the translation based on there being an adjustment to be performed;

providing an output of the translation adjuster to a client processor to be forwarded to the user;

obtaining, by the at least one processor, user feedback on the output;

determining, by the at least one processor, based on a satisfaction indication, whether the user is satisfied with the output;

a automatically changing, by the at least one processor, based on determining that the user is dissatisfied with the output as indicated by the satisfaction indication, one or more identified translation factors to provide updated translation information, wherein the automatically changing includes changing a type of translation indicated in the translation context information from one type of translation mechanism to another type of translation mechanism, the one type of translation mechanism being selected from a literal translation and another translation type and the another type of translation mechanism being selected from the literal translation and the another translation type and being different from the one type of translation mechanism;

repeating the translating the content from the first language to the second language to obtain another translation, wherein the repeating is performed automatically absent obtaining another combined translation request requesting translation of the content;

adjusting, by the translation adjuster, the other translation based on the updated translation information to provide an adjusted translation output; and providing the adjusted translation output to the client processor to be forwarded to the user.

17. The computer-implemented method of claim 16, wherein the translation context information is determined using information obtained online and includes information relating to the user.

18. The computer-implemented method of claim 16, wherein the translation context information is stored in a data structure, the data structure used to bi-directionally exchange translation context between the client processor and a server processor, the server processor obtaining the combined translation request from the client processor.

19. The computer-implemented method of claim 16, further comprising:

determining that the adjusted translation output is to be further adjusted for the user; and adjusting at least one identified translation factor of the one or more identified translation factors based on determining that the adjusted translation output is to be further adjusted for the user to provide at least one adjusted identified translation factor.

20. The computer-implemented method of claim 19, further comprising:

repeating the translating of the content to provide another content translation; and adjusting the another content translation based on, at least, the at least one adjusted identified translation factor.

* * * * *